United States Patent
Sorge et al.

(10) Patent No.: US 6,691,281 B1
(45) Date of Patent: Feb. 10, 2004

(54) PUBLISHING/REPUBLISHING DATA TABLES IN HTML DOCUMENTS WHILE MAINTAINING FORMATTING AND FUNCTIONALITY FOR RESTORING BACK THE DATA TABLES

(75) Inventors: Terri L. Sorge, Kirkland, WA (US); May May Quan, Kirkland, WA (US); Kent R. Lowry, Seattle, WA (US); Russell S. Johnson, Seattle, WA (US); John L. Dauphiny, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/333,816

(22) Filed: Jun. 15, 1999

(51) Int. Cl.[7] .............................................. G06F 15/00
(52) U.S. Cl. ...................... 715/503; 715/509; 715/513; 715/523
(58) Field of Search ................................. 707/504, 503, 707/516, 523, 515; 715/503, 509, 513, 516, 523

(56) References Cited

U.S. PATENT DOCUMENTS

| | | | |
|---|---|---|---|
| 5,860,073 A | * | 1/1999 | Ferrel et al. ................. 707/513 |
| 5,991,760 A | * | 11/1999 | Gauvin et al. ................ 707/10 |
| 6,078,924 A | * | 6/2000 | Ainsbury et al. ............ 707/101 |
| 6,182,092 B1 | * | 1/2001 | Francis et al. ............... 707/513 |
| 6,230,173 B1 | * | 5/2001 | Ferrel et al. .............. 707/501.1 |
| 6,396,500 B1 | * | 5/2002 | Qureshi et al. .............. 345/473 |

OTHER PUBLICATIONS

Moseley et al., "Microsoft Office 97", copyright 1997 SYBEX Inc., pp. 531, 1031–1041 in view of Francis et al., US 6,182,092 B1 filed Jul. 1997.*

Microsoft Corporation. *Getting Results with Microsoft® Office 97*. "Publish Microsoft Excel Tables and Charts on the Web." ©1995–1997 Microsoft Corporation. pp. 448–451.

* cited by examiner

Primary Examiner—Stephen S. Hong
Assistant Examiner—Thu V. Huynh
(74) Attorney, Agent, or Firm—Ronald M. Anderson

(57) ABSTRACT

A spreadsheet program directly publishes a data table or chart into an HTML document. The table or chart is published to a predefined location within the HTML document and a user is enabled to readily update the published table or chart to include changes made in the spreadsheet program by republishing the data table or chart. Furthermore, the published or republished data can be imported back into the parent spreadsheet program from the HTML document without loss of functionality or formatting that it had in the parent spreadsheet program. In addition, the data may be published in a form that can be used by ActiveX web components in order to provide spreadsheet functionality from within the browser application. A unique marker tag or identification tag within the HTML document indicates where the data table or chart has been inserted.

28 Claims, 5 Drawing Sheets

PUBLISHING/REPUBLISHING DATA TABLES IN HTML DOCUMENTS WHILE MAINTAINING FORMATTING AND FUNCTIONALITY FOR RESTORING BACK THE DATA TABLES

FIELD OF THE INVENTION

The present invention generally pertains to exporting data into hypertext markup language (HTML) documents, and more specifically, to updating a previously exported discreet data section in an HTML document, without changing any other section of the HTML document; and while ensuring that such data can be imported from the HTML document back into a source application with all the formatting unique to the source application intact.

BACKGROUND OF THE INVENTION

With the increasing popularity of the Internet, HTML documents or files has become the internationally accepted format for sharing data "on-line." An on-line information system typically includes a server computer system that makes information available so that client computer systems can access the information. The server and client computer systems are usually connected in either a local area or a wide area private Intranet system, or via the public Internet. A unique uniform resource locator (URL) is associated with each HTML document, enabling the client computer systems to request a specific HTML document from a server computer system.

An HTML document includes a hierarchical set of markup elements; most elements have a start tag, followed by content, followed by an end tag. The content is typically a combination of text and nested markup elements. Tags, which are enclosed in angle brackets ('<' and '>'), indicate how the document is structured and how to display the document, i.e., its format. There are tags for markup elements such as titles and headers, for text attributes such as bold and italic, for lists, for paragraph boundaries, for links to other documents or other parts of the same document, for graphic images, for non-displayed comments, and for many other features. Further details regarding HTML may be found in reference books such as, "HTML For Dummies," by Ed Tittel and Steve James (1996).

The following lines of HTML briefly illustrate how the language is used:

Here we start a new paragraph <P>.

Some words are <B>bold</B>, others are <I>italic</I>. The viewer of the document will see:

Here we start a new paragraph.

Some words are bold, others are italic.

As noted above, a user who wishes to retrieve and display an HTML document generally uses a Web browser program. Two of the popular Web browser programs are: NAVIGATOR™ from Netscape Communications Corp. of Mountain View, Calif., and INTERNET EXPLORER™ from Microsoft Corporation of Redmond, Wash. The primary functionality of web browsers is directed to finding, retrieving, and displaying documents. A browser is generally not intended for word processing or data manipulation of the information contained within an HTML document, but can display documents or data generated by word processing or spreadsheet applications, once converted into an appropriate HTML compatible format.

A wide variety of data may be shared among different users in a network environment using HTML. Typical HTML documents include images, text, and data. HTML documents can be created using programs specifically designed for that purpose, such as Microsoft Corporation's FRONTPAGE™ Web Page publishing program. Additionally, some applications, such as Microsoft Corporation's WORD 97™ word processing program, allow a user to save a text document as an HTML document. Microsoft Corporation's EXCEL 97™ spreadsheet program also enables a user to export a data table or chart created on a worksheet into an existing or new HTML document. If EXCEL 97 is used to export a data table or chart into an existing HTML document, the user is required to use a separate HTML editor to insert a marker tag, <!-- ##Table##-->, into the HTML document at the location where the table is to be inserted. EXCEL 97 will then convert the spreadsheet data table into the HTML compatible format and insert the data at the location in the HTML document specified by the marker tag. It would be desirable to be able to export a spreadsheet data table converted into HTML compatible format into an HTML document without requiring that an HTML editing application insert a <!-- ##Table##--> marker tag.

A characteristic of data tables or charts incorporated into HTML documents using prior art methods is that once the data tables or charts are imported into the HTML document, they lose virtually all of the functionality that they had in the spreadsheet application. Furthermore, a data table published into an HTML document cannot be reintroduced into its parent application with its original functionality intact, because critical formatting information unique to the parent spreadsheet application, such as any formulas included in the data table, are not maintained. Thus, formulas and other spreadsheet application unique parameters are lost in the publication process. Manipulation of the data from the HTML document within the parent application is thus not available.

Often, it would be desirable to enable changes to data in a table or chart published into an HTML document. For example, assume that an HTML document created by a real estate brokerage firm includes a data table for determining monthly mortgage payments based on the amount of the loan (rounded to the nearest $1000), a current annual interest rate, and a fixed term. Additionally, the web page may include some text relating to the real estate services offered by the brokerage firm and a few testimonials from satisfied customers. Prospective purchasers of real estate may use the table to determine the monthly payments on a property. The table is most easily created in a spreadsheet application, converted into an HTML compatible format, and inserted into an HTML document that includes text produced with an HTML editor.

After several weeks, the brokerage firm may recognize that the table is less useful than desired because the interest rate has changed. To modify the table so that it is based on the newer current interest rate, the broker must create a new table with the spreadsheet application, convert the new table into the HTML compatible format, and then insert the revised table into the HTML document. Note that using only an HTML editor to change the original imported table would require manual input of not just the new interest rate, but also each and every monthly payment listed in the table. The data table in the HTML document does not have any spreadsheet functionality, and changing the interest rate value used in the spreadsheet formula to calculate the monthly payments does not result in an automatic recalculation of the monthly payments values shown in the table within the HTML document. Clearly, it would be desirable to enable a chart or data table in an existing HTML document to be updated using the spreadsheet application, rather than by use of an HTML editor.

It would also be desirable to avoid the need to recreate the data table in the spreadsheet application simply to make a change. While recreating the data table is not necessary if the original data table was saved in its spreadsheet format, there will be times when the spreadsheet format of the data table has not been saved or has been deleted. Under the prior art, if an attempt is made to import the data table or chart from the HTML document back into the spreadsheet application for revisions, any formulas or formatting unique to the spreadsheet application originally used to create that data table or chart would no longer be present, having been lost in the process of translating the data table or chart into the HTML compatible format. Thus, the prior art cannot successfully "roundtrip" the data represented by the data table or chart back from the spreadsheet application, into an HTML document, and then back into the spreadsheet application. It would be desirable for data tables or charts created in a spreadsheet application to be readily inserted into an HTML document, and then subsequently imported back into the spreadsheet application without loss of functionality.

Currently, a data table or chart loses its computational functionality once it is exported from a spreadsheet application into an HTML document. The data table simply becomes a table of entries in an HTML document. Any change in an entry is incapable of causing a change in any other entry. Certainly, it would be more useful if the imported data table or chart retained its spreadsheet functionality, so that a change in one of the cells would cause any other values that depend upon the changed cell to be recalculated. In the previous example of an HTML document for a real estate brokerage firm, an active data table that retains its spreadsheet functionality would enable a user to enter a loan amount, the term, and the current interest rate, causing the monthly mortgage payment based upon these parameters to be determined and displayed.

SUMMARY OF THE INVENTION

In accord with the present invention, a method is defined for using an application program in which data having a format and a functionality specific to the application program are created, to publish at least a portion of the data into an HTML document such that when changes are made to the original data selection in the application program, those changes can be readily republished into the HTML document to replace the previously published data selection. Furthermore, when the HTML document containing the published or republished data selection is subsequently opened in the application program, the data selection retains the formatting and functionality that it originally had in the application program. The method uses the application program to select the portion of the data to be published. The data selected are then translated into an HTML compatible format, while preserving parameters that define the format and functionality of the data within the application program used to create the data. Once translated, the translated data are inserted into the HTML document.

Preferably, the application program is a spreadsheet program and the data that are translated comprise either a data table or a chart.

This method preferably includes the step of creating a unique identifier (ID) that is associated with the data that are translated and inserted into the HTML document. The unique ID is stored with the original data from which the portion of the data is selected and also included within the HTML document. The translated data can then replace an older version of the data that were translated and previously inserted into the HTML document by the application program, thereby republishing the data to include changes made after the data were previously published. Reference to the unique ID enables the application program to identify the older version of the data and replace the older version of the data within the HTML document with the translated data comprising the newer version.

Consider the case where the application program is a spreadsheet program and the data selection is a data table that includes a plurality of cells. If at least one cell includes a formula that returns a calculated value in response to a change in a parameter in another of the plurality of cells, the translated data table inserted into the HTML document retains the functionality of the formula, so that a change in the parameter within the HTML document causes a recalculation of the formula to return a new calculated value that is retained when the HTML document is loaded back into the application program.

Preferably, the step of preserving the format of the translated data comprises the step of storing formatting information for the translated data within a style section in the HTML document.

The application program preferably inserts tags into the HTML document, indicating a beginning and end of the translated data inserted, and indicating functional elements of the data.

Other aspects of the present invention are directed to an article of manufacture that includes a memory media for carrying out functions generally consistent with the steps of the method described above, and to a system that includes a memory for storing machine instructions and a processor. When the machine instructions are executed by the processor, they implement functions that are also generally consistent with the steps of the above-described method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the present invention will be included in the EXCEL 2000™ spreadsheet program, which will be distributed by Microsoft Corporation as part of its OFFICE 2000™ product line. As implemented therein, the present invention will enable a user or creator of a spreadsheet to publish a data table from the spreadsheet into any HTML document at a preselected location without requiring a separate HTML editor to define the location with a marker tag. In addition, the user can easily republish or refresh a data table that had been previously published by the spreadsheet program into an HTML document to reflect changes in the data table that were made in the spreadsheet application. Furthermore, the present invention enables a user to reintroduce a data table previously published into an HTML document back into the spreadsheet application without loss of formatting or functionality. Before explaining how these features are implemented, it will be helpful to define several terms.

The term "publish" as used herein and in the claims that follow means to export data (such as a data table or a chart) from a source application (such as a spreadsheet program or a database program) into an HTML document. The terms "republish" and "refresh" as used herein and in the claims that follow mean updating that data that was previously published into an HTML document, to include any changes subsequently made to the data, using the source application in which the data was originally created. The updating process can be limited to refreshing data values or can be a more detailed republishing in which significant revisions to the data are made. The term "HTML document" as used herein and in the claims that follow means a file that includes HTML content, which is intended to be viewed or displayed with a Web browser. The term "data" as used herein and in the claims that follow means any information produced by a spreadsheet, database, or word processing application, such tables, charts, text, or images. The following example of a preferred embodiment of the present invention is applied to a spreadsheet application, generally as will be implemented in Microsoft Corporation's EXCEL 2000 spreadsheet application; however, it is not intended that the invention be limited to this application, since it can be clearly applied to other types of data, created in other types of applications. For simplicity, all further references to the EXCEL 2000 program in the following description will omit reference to the term "spreadsheet program."

Figure 1:
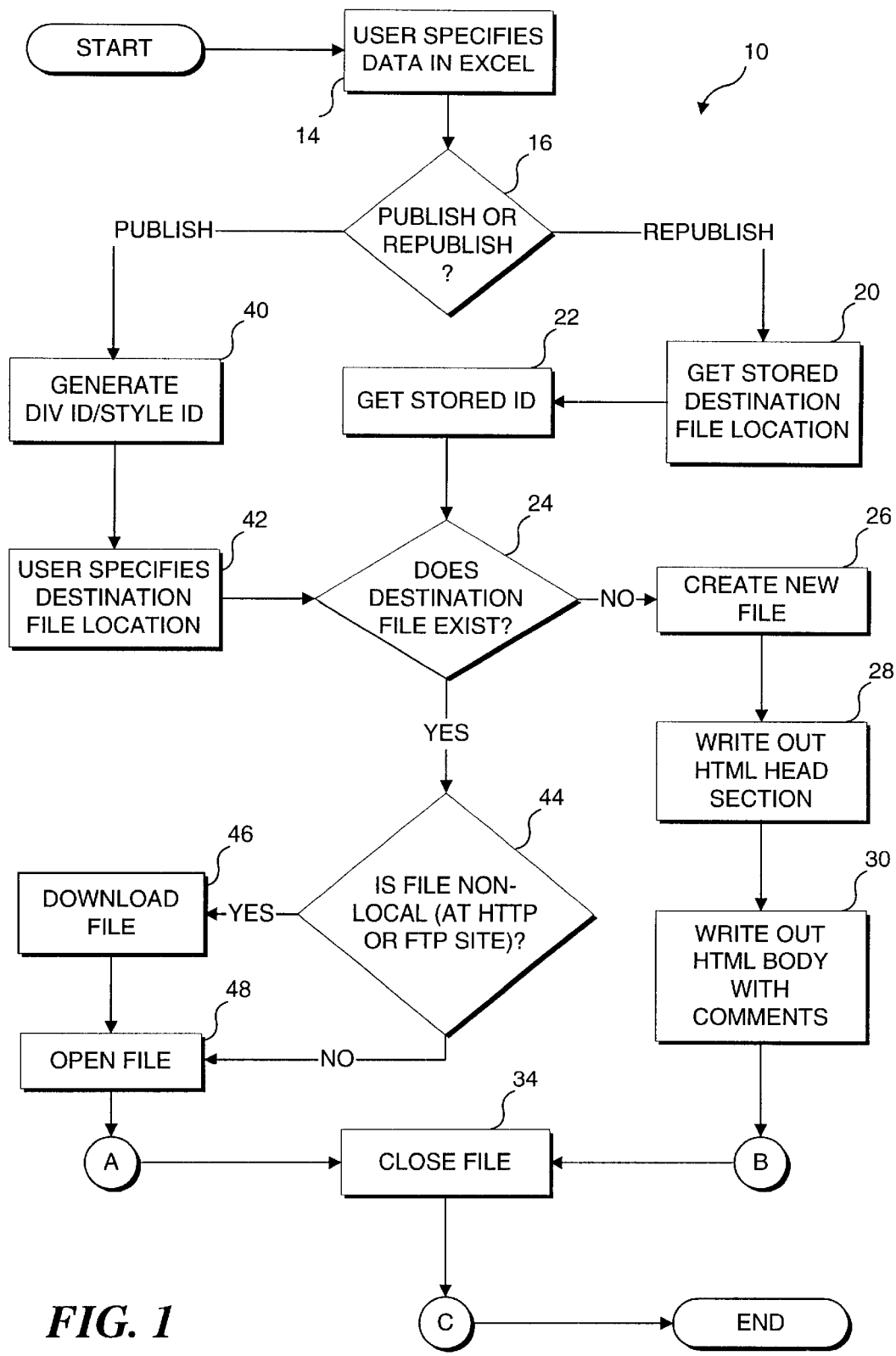
FIG. 1 is a flow chart illustrating the logical steps implemented to publish or republish a data table into an HTML document from a source application, in accord with the present invention.

FIG. 1 illustrates the logical steps used in EXCEL 2000 to publish or republish a data table into an HTML document. In a block 14, the user specifies or selects data in EXCEL 2000 to be published or republished into an HTML document, for example by selecting a range of contiguous cells using a cursor controlled by a mouse or other pointing device. A decision block 16 prompts the user to indicate whether the data selected are to be published or republished. If the user indicates that the selected data are to be published, the selected data will be inserted into an existing HTML document, or a new HTML document may be created that will include the EXCEL 2000 data. The republish/refresh feature enables an EXCEL 2000 user to update a data table or chart previously published from EXCEL 2000 into an HTML document.

For instance, an EXCEL 2000 user may have published a data table representing real estate mortgage payment calculations into an HTML document. Assume the data table lists a plurality of loan amounts in $10,000 increments, the current interest rate for home loans, and calculates the required monthly payment based on each loan amount and the interest rate. A person viewing the HTML document in a Web browser would be able to select the loan amount most closely representing the loan required for a particular purchase to determine the monthly mortgage payment. Because interest rates are subject to frequent change, it is likely that the creator of such a table would want to regularly update that table to reflect the current interest rate.

The EXCEL 2000 republish feature easily allows such a user to enter EXCEL 2000, open the appropriate data table that was previously saved as a spreadsheet, enter the current interest rate, and then republish the data table into the HTML document. Under the prior art, it would have been necessary to use an HTML editor application to edit not just the interest rate in the HTML document, but also all of the monthly payment results for each loan amount value that existed in the data table. Alternatively, an entirely new data table could be created and published, replacing the old table in the HTML document. When using EXCEL 2000 to republish the new version of the table, the user only needs to enter the new interest rate into EXCEL 2000, which recalculates the data table. The user then republishes the data table into the HTML document, changing all of the values for the monthly payment. The republication function is thus a much simpler process than any available in the prior art.

Assuming a user selects the publish feature at decision block 16, the logic proceeds to a block 40. In a block 40, EXCEL 2000 generates a unique ID attribute for the DIV tag. The ID attribute is an important feature that facilitates republishing of data in an HTML document. In order to make republishing efficient, EXCEL 2000 needs to be able to find the information to be replaced. This approach is particularly helpful when an HTML document contains multiple data tables published from EXCEL 2000. The DIV ID tag uniquely identifies each data table, so that the correct data table may be replaced when the user chooses to republish. Each item published will thus have a unique identifier generated at the time of publication. This unique DIV ID tag is incorporated into the HTML document and is also stored in the EXCEL 2000 spreadsheet from which the data are derived.

Preferably, the data table inserted into an HTML file will be surrounded by DIV tags. That is, information published to a file will be surrounded by <DIV> tags as shown here:

<DIV ID=identifier>

Publishedinfo

</DIV> where:

identifier is a unique string generated by EXCEL 2000, and

Publishedinfo is the data table transformed into HTML when published by EXCEL 2000.

Preferably, the DIV ID is a unique string generated by EXCEL 2000. In EXCEL 2000 the DIV ID string is "workbook.xls_random number," where workbook is the name of the workbook from which the data are being published, and the "random number" is a number up to five digits long that is randomly generated by EXCEL 2000.

If more than one data table is published to the same HTML document, EXCEL 2000 will be able to easily locate and republish the correct chart or data table by using the unique ID in the DIV ID and Style ID. As noted above, once generated, the unique DIV ID is incorporated into the HTML document, as well as stored in the parent EXCEL 2000 Workbook file from which the chart or data table was selected. Thus, when this EXCEL 2000 Workbook file is accessed and changes are made to the data table, these changes may be easily republished in the HTML document at the section of the HTML document corresponding to the EXCEL 2000 data table that has been changed.

Once the DIV ID has been generated at block 40, the logic proceeds to a block 42 in which the user specifies the destination file location. Note that the HTML document may be stored locally, or at a remote location. The user must provide input to a dialog box in EXCEL 2000 indicating the location of the document. This step leads to a decision block 24 in which the logic determines whether the indicated destination file exists. As mentioned earlier, it is possible that the HTML document into which the data table will be published may already be an existing HTML document, or it may be an HTML document which will be created by the act of publishing the EXCEL 2000 data table and converting into HTML compatible format. At decision block 24, if an HTML document does not already exist, the logic leads to a block 26 in which a new HTML document is created. Note that if in block 40 the user does not enter a destination file location, then in decision block 24, the logic will determine that the destination file does not exist.

The logic then proceeds to a block 28 in which a head section of the new HTML document is written out. Preferably, the head section will include comment information to make the newly written HTML more understandable to users viewing the HTML in an editing mode, such as:

<HEAD> tag: In cases where a new file is created, a <HEAD> tag is generated that includes a META tag for content type, language, generator, title, keywords, subject, etc.

<DIV > tag: The <DIV> tag is used so that republishing the Excel data is supported.

<small><h1 style="color: black; font-family: default font; font-size: 14 pt;

font-weight: 800; font-style: normal;"></small><small> Author's title is inserted here.</small><LINK> tags for related and supporting documents.

<TITLE> tag with filename.

For example, if the user publishes a range of data from Sheet 1 in Workbook 1.xls to create a new HTML file, the head section would appear as:

<HTML>

<HEAD>

<META> tags for content type, language, generator, title, keywords, subject . . .

<TITLE> text from Publish Wizard</TITLE>

</HEAD>

Once the head section is completed at block 28, the logic proceeds to a block 30 in which the body of the HTML document is written out, along with any comments. It is important to note that the functionality of the data is stored in this section of the HTML document. When translating the EXCEL 2000 data into HTML, all of the relevant formatting information is translated into a style tag included in the HTML document. This step is critical so that when the data are reintroduced into EXCEL 2000 from the HTML document in a "round trip," all of the formatting required by EXCEL 2000 for proper data manipulation will be included. It is also important to note that the body of the HTML document written by EXCEL 2000 may include information relative to using an ActiveX control to enable the viewer of the HTML document displayed in a browser to actually manipulate the data, not just view the data.

Preferably, the ActiveX control is only written into the HTML being published or republished if the user has actively selected that "interactive" HTML be exported. The term "interactive" is used to denote the spreadsheet functionality of a data table in an HTML document being viewed in a browser obtained by using an ActiveX control. The term "static" HTML refers to HTML with no ActiveX control component. In the preferred embodiment, static HTML is the default selection unless the default is overridden by the user. Such a selection is preferably made in conjunction with publish/republish decision block 16, which was discussed above. At decision block 16, EXCEL 2000 will provide the user with an opportunity to select interactive verses static HTML translation of the data.

The use of an ActiveX control is well understood in the computer arts, and those of ordinary skill in the art will readily appreciate how the ActiveX control may be used in accord with the present invention to provide "interactive" data tables in HTML documents. Further information regarding the ActiveX control may be found in the following reference: David Chappell: Understanding ActiveX and OLE, Redmond, Wash: Microsoft Press, 1996. ISBN 1-572-31216-5.

Having completed writing out the body of the new HTML document in block 30, the logic flows to a data table writing subroutine 15. This data table writing subroutine is shown in greater detail in FIG. 3, and will be discussed below with reference to that Figure. Once the logic has completed data table writing subroutine 15, the logic proceeds to a block 34, in which the file is closed, causing a closing file subroutine 17 to be implemented. The details of the closing file routine are shown in FIG. 4, and again will be discussed in detail with reference to that Figure. Once closing file subroutine 17 is finished, the publish (or republish) process is complete.

If in decision block 24 the logic determines that a destination file exists, the logic moves to a decision block 44 in which the logic is required to determine if the destination file is local or stored at a remote HTTP/FTP site. If the destination file is local, the logic proceeds to a block 48 and the destination file is opened. If the destination file is not stored locally, the logic proceeds to a block 46, and the file is downloaded. Once the destination file is downloaded, the logic proceeds to block 48, which indicates that the destination file is opened. Thereafter, the logic proceeds to a parsing subroutine 11 in order to insert the data into the HTML document, which is described in detail in FIG. 2. Once parsing subroutine 11 is complete the logic flows to block 34, and the file is closed (using close file subroutine 17) thus completing the process.

Returning to decision block 16, the logic determines whether the user desires to publish or republish. If the user desires to republish, the logic flows to a block 20, which retrieves the selected HTML document. The logic then proceeds to a block 22, to retrieve the unique ID associated with the selected data table in EXCEL 2000, which is to be republished (as noted above, when a selection from Excel 2000 is published, a unique ID is generated and incorporated into the HTML document and also stored in the source EXCEL 2000 Workbook file). As discussed above, the ID is used by EXCEL 2000 to determine the location in the existing HTML document at which to insert the data being republished. EXCEL 2000 creates a unique ID by appending a 5-digit randomly generated number to the workbook name. The 5-digit number is guaranteed to be unique for all publications made from that source workbook. It should be noted that the ID is common to both the data in the source Excel 2000 Workbook file and in the corresponding data in the HTML document. The DIV and Style tags for the data will use this unique identifier in their ID attributes, except that the Style tag ID attribute will have "_Styles" appended to the identifier. The 5-digit portion of the identifier will also be used to create style class names for the data to be published in order to minimize duplicating style class names that may already exist in the HTML document. Once the ID is determined, the logic proceeds to decision block 24. Both possible exits from decision block 24 have been fully described above.

EXCEL 2000 will insert a data table into an existing HTML document in one of three locations. A first possible location (for either publish or republish) is at a matching DIV ID/Style ID tag marker tag as discussed above. A second possible location is at a table marker tag (<!-- ##Table##-->). A third possible location is immediately preceding the close body tag (</body>) of the HTML document. Preferably, the location choice is selected based on the following rules:

- If the file contains a DIV tag whose ID matches the DIV ID for the item being republished, replace data within the data table associated with that DIV tag.
- If the file contains multiple DIV tags whose ID matches the DIV ID for the item being published, replace only data within data table associated with the first DIV tag encountered.
- If the file doesn't contain a DIV tag whose ID matches the published item's DIV, but does contain the string <!--##Table##-->, replace that string with the published data.
- If the file doesn't contain a DIV tag with a matching ID or a <!--##Table##--> tag, but it does contain a </BODY> tag, insert the published data prior to the </BODY> tag.
- If the file doesn't contain a DIV tag with a matching ID, a <!--##Table##-->tag, or a <BODY>tag, alert the user that the data cannot be published to this document.

It is contemplated that locations within an HTML document for inserting the data table or other data may also be selected by the user. For example, instead of inserting the data table immediately preceding the close body tag (</body>) of the HTML document, the data table can be inserted immediately following the start body tag (<body>). Such a location is generally not preferred, as this location represents the beginning of the HTML document displayed to a viewer in a Web browser and is thus generally reserved for introductory text or images. Any location in an HTML document that is associated with a recognizable tag can be used as a predefined data insertion point. The close body tag (</body>) is preferred because it should exist in any HTML document, and the insertion of a data table at that location (the end of the HTML document) is less likely to disrupt the format or "look" of the HTML document. It should be noted that EXCEL 2000 does not support insertion of the data at these other locations, although this feature may be desirable.

Figure 2:
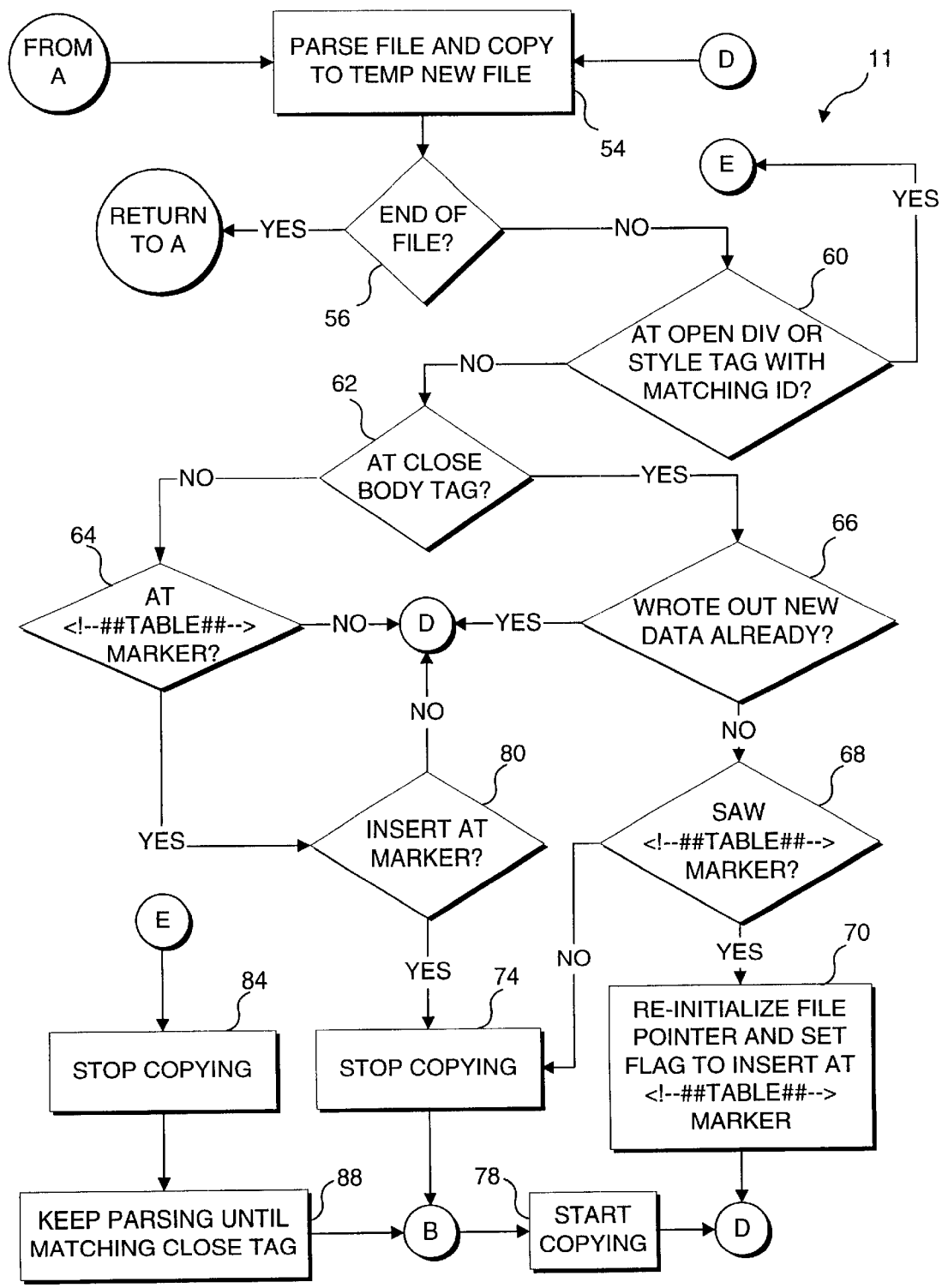
FIG. 2 is a flow chart illustrating the logical steps implemented to complete a parsing routine used when publishing or republishing a data table into an HTML document from a source application, in accord with the present invention.

FIG. 2 provides details of parsing file subroutine 11, which is used whenever the data selected from EXCEL 2000 is to be published or republished into an existing HTML document. EXCEL 2000 retrieves the HTML document, opens it, and then parses the HTML document in order to copy the existing HTML. The new HTML representing the data selected in EXCEL 2000 is inserted in the proper position within the copied HTML document, replacing any previously published EXCEL 2000 data (for which the ID of the new data matches the old data). This process employs a new temporary file. EXCEL 2000 will begin parsing and copying the existing HTML document to the temporary file until the parsing process determines that the location at which the new HTML is to be inserted has been found, at which point EXCEL 2000 stops copying the HTML document. The new HTML compatible data representing the selected EXCEL 2000 data are written to the temporary file, and then copying of the HTML document resumes after the end of the previous data that is now replaced and continues until the end of the document is reached. If this step is completed successfully, the temporary file is renamed, effectively replacing the previous HTML document.

When the logic determines that parsing subroutine 11 is required, the process is started at a block 54 in FIG. 2, so that text being parsed is copied to the temporary new file. The logic then proceeds to a decision block 56 in which the logic determines whether the end of the HTML document has been reached. If the end of the HTML document has been reached, the logic proceeds to block 34 of FIG. 1, and the HTML document is closed. If in decision block 56 the logic determines that the end of the HTML document has not been reached, the logic proceeds to a decision block 60.

Figure 3:
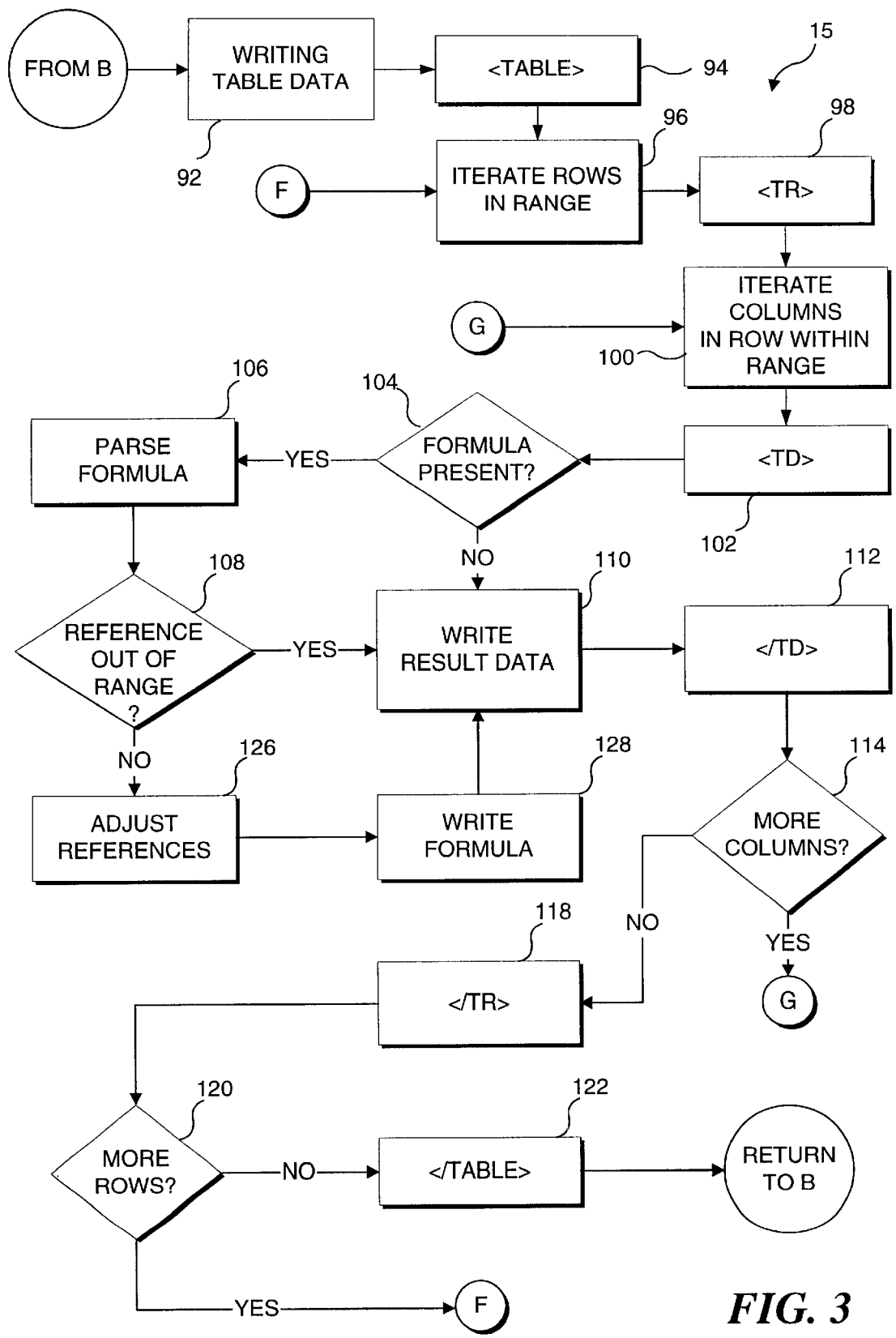
FIG. 3 is a flow chart illustrating the logical steps implemented to complete a data table writing subroutine, in accord with the present invention.

At decision block 60, the logic determines whether an open DIV tag (<DIV>) or style tag (<ID>) with a matching ID has been reached during the parsing of the document. If so, the logic proceeds to a block 84. At block 84, the logic stops copying the existing HTML document to the temporary new file and proceeds to a block 88, which provides for parsing beyond the open DIV tag (<DIV)> or style tag (<ID>) with matching ID found in decision block 60, until the associated close tag (<LIV>) is found. The logic then proceeds to data table writing subroutine 15, which is shown in FIG. 3. Thus, when a selected EXCEL 2000 data table is translated into HTML, it is inserted into the HTML document at the end of the close tag (</DIV>) associated with an already published EXCEL 2000 data table. It should be noted that the already published EXCEL 2000 data table will be completely replaced by the new data table created by data table writing subroutine 15, as all of the information relative to a data table published from EXCEL 2000 is completely contained between the <DIV>and </DIV> tags.

After data table writing subroutine 15 is complete, the logic proceeds to a block 78, and copying of the existing HTML document is started once again. In this manner, the newly written data converted to HTML compatible form and representing the selected data table from EXCEL 2000 is inserted at the correct location within the HTML document. From block 78, the logic proceeds to block 54, and parsing of the original HTML document continues until the end of the document is reached.

At decision block 60, the logic determined whether at that point in the HTML document an open DIV or style tag with matching ID had been found. The above section describes the response if such a matching ID is found. If no matching ID is found, the logic flows to a decision block 62, to determine whether the instant location in the HTML document is at a close body tag (</body>). If a close body tag has been reached, a decision block 66 determines whether any new data has already been written. If new data has been written, the logic flows back to block 54, and parsing of the HTML document continues. In decision block 56, the logic determines if the end of the HTML document has been reached.

If at decision block 66 the logic determines that no new data has been written, the logic flows to a decision block 68. At decision block 68, the logic determines whether or not a table marker tag (<!--##Table##-->) was found while the HTML document was being parsed. If the table marker has been seen, the logic moves to a block 70. At block 70, the logic re-initializes the file pointer and sets the flag to insert the newly written HTML representing the selected data table from EXCEL 2000 at the table marker tag found. The logic then returns to parsing and copying the HTML document in block 54. If at decision block 68 the logic determines that no table marker tag has been found, the logic proceeds to a block 74.

As discussed with respect to FIG. 1, the newly written data in HTML compatible format representing the data table selected in EXCEL 2000 will be inserted in one of three possible locations. The decision blocks in FIG. 2 define the logic used to make that determination. For example, if at decision block 68, the logic determines that a table marker tag was seen in the HTML document, it can be concluded that although a table marker is present, no matching ID exists within the HTML document (otherwise a prior decision block would have called for the insertion at the matching ID, and a different path would have been followed). According to the preferential insertion rules noted above, the logic should insert the newly written data in HTML compatible format representing the data table selected in EXCEL 2000 at the table marker tag. This result is obtained when the logic proceeds to block 70 from decision block 68 as a result of an affirmative response to the decision inquiry. It should be recalled that one of the insertion rules provides that if no table marker tag, no matching ID, and no close body tag are present in the HTML document, an error message will be sent to notify the user of this circumstance. In such a case, the logic followed in FIG. 2 would proceed from finding no matching ID at decision block 60, to finding no close body tag at decision block 62, to finding no table marker at decision block 64, and would then return to parsing the HTML document at block 54, exiting parsing subroutine 11 at decision block 56. Thereafter, the logic would proceed to closing file subroutine 17, which as noted below, includes an error message block to notify the user that none of the three above-listed elements have been found in the HTML document.

Returning to block 74 in FIG. 2, the logic stops copying the HTML document to the new temporary file. The logic then proceeds to data table writing subroutine 15, which, as mentioned above, is shown in FIG. 3. Once the EXCEL 2000 selected data table has been written into HTML compatible form, the logic returns to block 78 and starts copying the HTML document, as described above. From that point, the logic returns to block 54 and continues to parse the HTML document and to copy the HTML document to the new temporary file (until the end of the HTML document, at which point parsing subroutine 11 is exited).

Now returning to decision block 62, if the logic determines that the instant location being parsed in the HTML document is not at a close body tag (</body>), the logic continues to decision block 64. Decision block 64 determines whether or not the instant location being parsed in the HTML document is at the beginning of a table marker tag (<!--##Table##-->). If not, the logic returns to parsing and copying the HTML document (file) in block 54. If the instant location is at the beginning of a table marker tag, the logic proceeds to a decision block 80. Decision block 80 determines whether to insert the data in HTML compatible format representing the data table selected from EXCEL 2000 at the table marker tag (using the insertion rules as previously discussed with respect to FIG. 1 and with respect to decision block 68 of FIG. 2). If decision block 80 determines that the HTML data should not be inserted at the table marker tag, the logic flows back to step 54 and continues to parse and copy the HTML document. If at decision block 80 the logic determines that the EXCEL 2000 data table is to be inserted at the table marker tag, the logic flows to block 74, and the logic stops copying and writes the new data (as was discussed above with respect to decision block 68).

It should be noted that block 74 and block 84 are equivalent, but lead to slightly different logic paths. These blocks both require that the copying of the HTML document into a temporary new file be halted. Immediately after block 84, the logic proceeds to block 88, which requires the logic to keep parsing the DIV or style tag (found in the HTML document, having an ID that matches the data table selected in EXCEL 2000; see the discussion supra of decision block 60) until a matching close tag (</DIV>) is found. This step is not required in the logic path that leads to block 74, because no DIV or style tag was found in decision block 60; thus, there is not an open DIV or style tag to parse until a matching close tag is found. Both block 88 and block 74 lead to data table writing subroutine 15, which is shown in FIG. 3, so that the selected EXCEL 2000 data table is translated into HTML compatible format. Once data table writing subroutine 15 is completed, the logic returns to block 78, and the copying of the HTML document is resumed. The stop copying step described in block 74 and block 84 (and associated block 88), data table writing subroutine 15, and start copying block 78 work together to ensure that the newly written data in HTML compatible format representing the data table selected from EXCEL 2000 are inserted into the HTML document at the correct point.

When the logic determines that writing a data table from the EXCEL2000 format into HTML is required, the logic initiates data table writing subroutine 15. The logic proceeds to a block 92 in which the data table writing subroutine is initialized, and then to a block 94 in which the table tag is opened (<TABLE>). The logic then advances to a block 96 in which it iterates the rows in the selected range. In a block 98, the table row tag (<TR>) is opened. The logic will then proceeds to a block 100, which provides for iterating any columns within the specified range. From there, the logic proceeds to a block 102 in which the table cell tag (<TD>) is opened.

A decision block 104 next determines whether a formula is present in the current cell. If a formula is present, the logic moves to a block 106, and the formula is parsed. From there, the logic flows to a decision block 108 to determine whether any references in the formula are out of the specified range. If no references are out of the specified range, the logic flows to a block 126, and the references to row/column as they appear in the HTML document are adjusted. For example, if the range selected by the user does not include cell A1 (the "first" cell in a table, located in the upper left hand corner) the output is adjusted so that in the table as displayed in the HTML document, the top left cell in the published range will be displayed as A1. The following illustration should clarify this point. A data table is displayed in EXCEL 2000 as follows:

| In Excel | A | B | C | D |
|---|---|---|---|---|
| 1 | | | | |
| 2 | | 10 | | |
| 3 | | | 15 | |

If the user selects the range B2:C3 (indicated by the dark lines) from the EXCEL 2000 spreadsheet for publication, the converted data will be shown as

| In HTML | A | B |
|---------|-----|-----|
| <u>1</u> | 10 | |
| <u>2</u> | | 15 |

The underlined elements are shown for illustrative purposes only, and would not be displayed in the spreadsheet or in the HTML document.

After adjusting the references in block 126, the logic proceeds a block 128 in which any formula in a cell being processed is written in HTML as a comment tag, so that if the resulting data table portion of the HTML document is "round tripped" back into EXCEL 2000, all the formatting necessary for full functionality of the table cells in EXCEL 2000 will be retained and made available. The logic next flows to a block 110, which provides for writing the result data (from executing the formula) in HTML to a table cell tag (<TD>). The logic then proceeds to a block 112, for generating a close table cell tag (</TD>). A decision block 114 determines whether more columns are present. If no more columns are present, the logic flows to a block 118, which generates a close row tag (</TR>). Next, a decision block 120 determines whether any more rows are present. If no more rows are present, the logic flows to a block 122, which generates a close table tag (</TABLE>). At this point, the data table writing subroutine is completed.

Returning to decision block 104, if the logic determines no formula is present in the current cell, the logic proceeds to block 110 and writes the result data (the contents of the cell) in HTML. The logic then proceeds to block 112 and generates the close cell tag as described above (</TD>). If at decision block 108 the logic determined that a reference from the formula is out of range, block 110 again writes the result data (i.e., the displayed contents of the cells), and then the logic again proceeds to block 112 to generate the close cell tag. It should be noted that block 110 may be entered from either decision block 104, decision block 108, or block 128.

If at decision block 114 the logic determines that more columns are present, the logic returns to block 100 and iterates any columns in the row that within the selected range. Similarly, if at decision block 120 the logic determines that more rows are present, the logic returns to block 96 and iterate any rows remaining within the selected range, and then repeats the above logical steps until the data table writing subroutine is complete.

Figure 4:
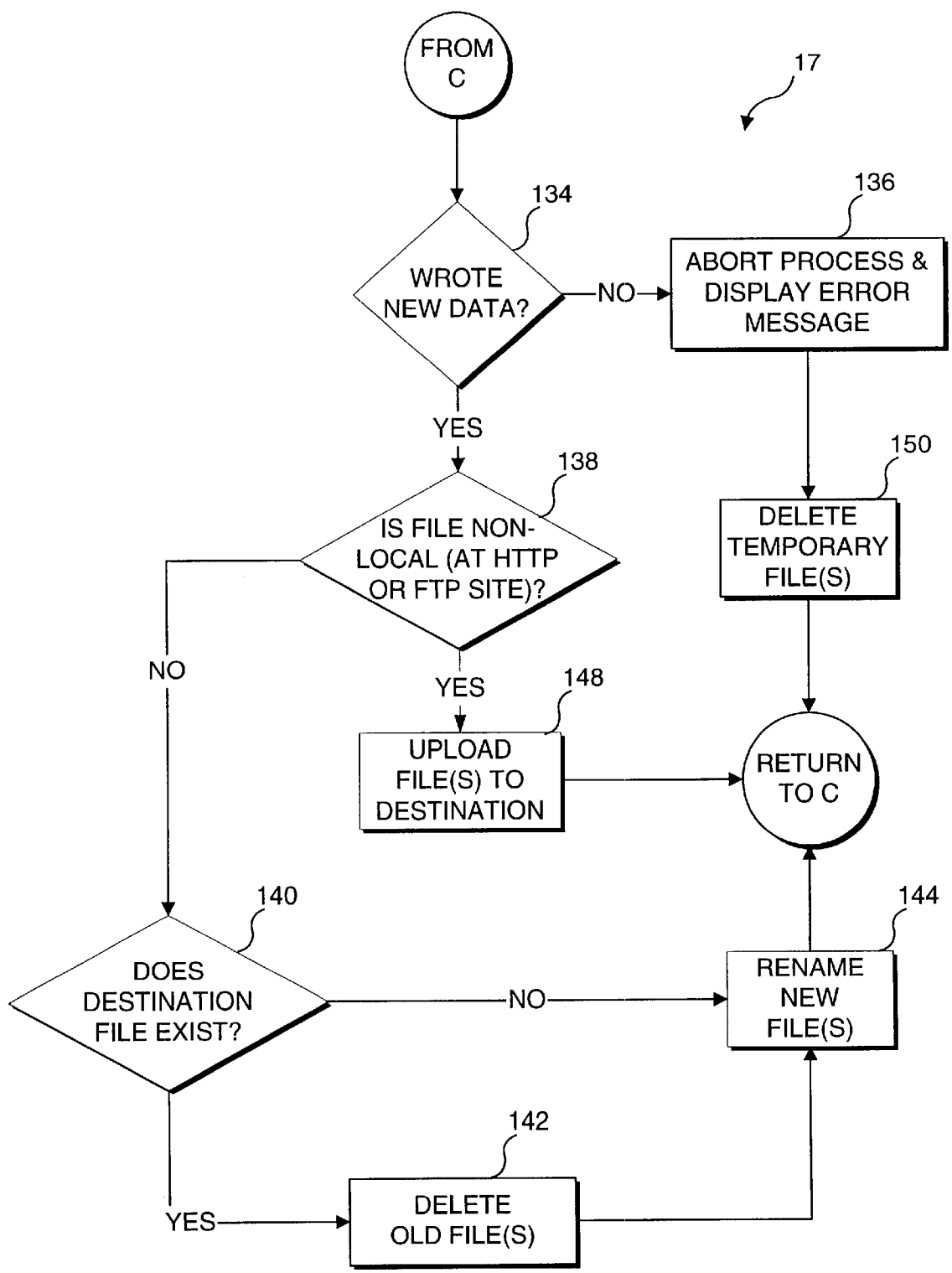
FIG. 4 is a flow chart illustrating the logical steps implemented to complete a close file subroutine when publishing or republishing a data table into an HTML document from a source application, in accord with the present invention.

FIG. 4 illustrates the logical steps involved in closing file subroutine 17. Once the logic has determined that closing file subroutine 17 should be started, it advances to a decision block 134, which determines if new data has been written into the HTML file. If no new data has been written, the logic proceeds to a block 136 and aborts the process. An error message is displayed to the user, and then a block 150 deletes any temporary files. At that point closing file subroutine 17 is completed. The user has the option of reselecting publish or republish and initializing the process again. For example, if the user initially chose republish, but if a matching ID tag, a table marker tag, or a close body tag was not found in the HTML document, it would be appropriate to start over again and select the publish option to create a new corresponding data table in the HTML document.

If at decision block 134 the logic determines that new data has been written, a decision block 138 next determines whether the HTML file was resident on the computer used by the user or was retrieved from an HTTP or FTP site. If the HTML file was resident on the computer being used by the user, a decision block 140 determines whether the destination file exists. If the destination file exists, a block 142 next deletes the old file. From that point the logic flows to a block 144 and renames the new file(s) to the name of the file(s) just deleted. It should be noted that there may be multiple files to support images for charts and data caches for pivot tables. At this point, closing file subroutine 17 is completed.

If decision block 140 determines that no destination file exists, the logic proceeds to block 144 and renames the new file. At that point, closing file subroutine 17 is completed. If at decision block 138 the logic determines that the original HTML file was retrieved from an HTTP or FTP site, the logic advances to a block 148 in which the newly written HTML file is uploaded to the destination where it will be stored, completing closing file subroutine 17.

Exemplary Operating Environment

Figure 5:
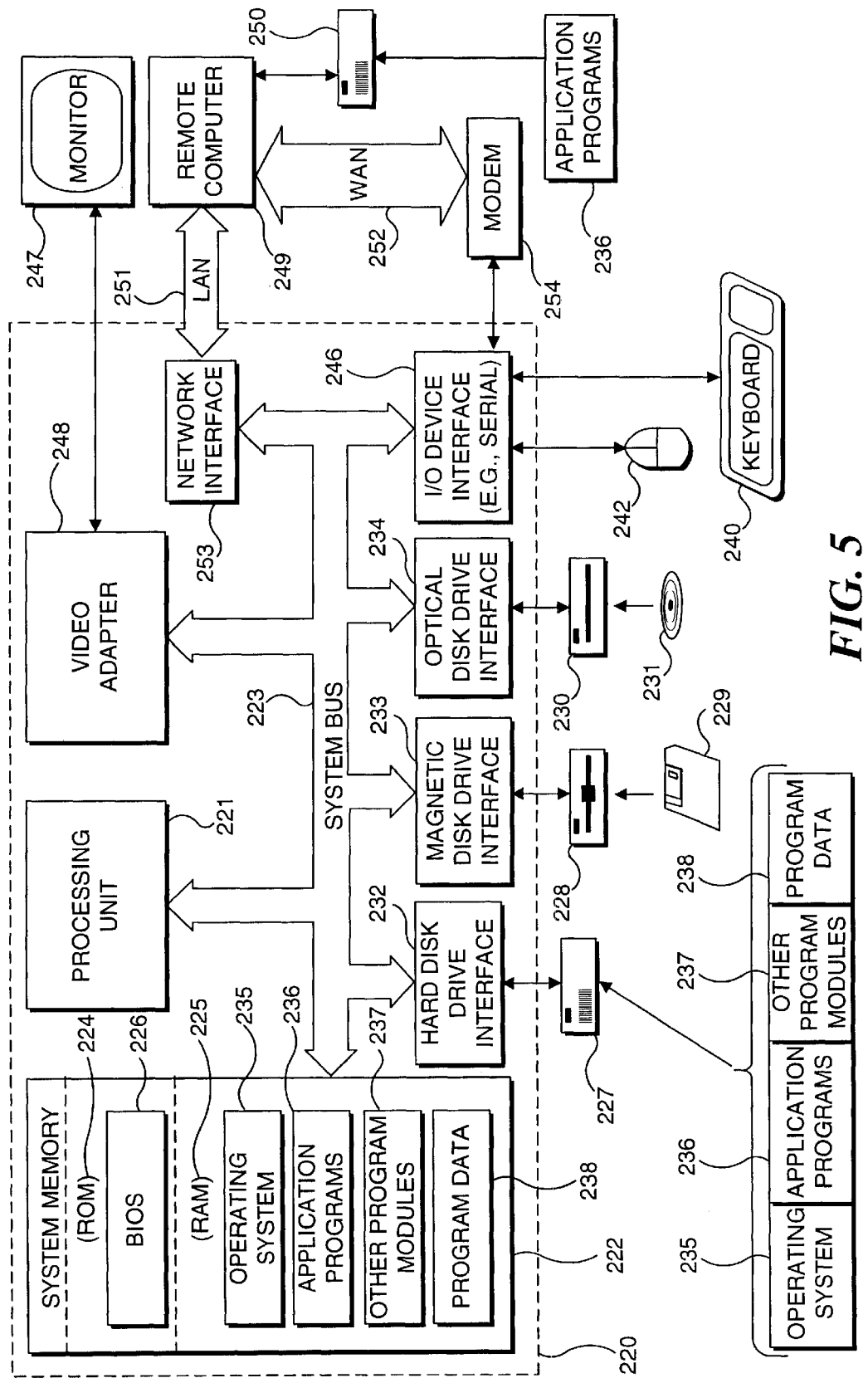
FIG. 5 is a block diagram of a personal computer system suitable for implementing the present invention.

FIG. 5 and the following discussion are intended to provide a brief, general description of a suitable computing environment in which the invention may be implemented. As discussed above, a preferred embodiment of the Publish/Republish feature is implemented as part of a spreadsheet program (EXCEL 2000) that is executed by a personal computer or workstation. The application program comprises a plurality of program modules that include routines, programs, objects, components, data structures, etc., which perform particular tasks or implement particular abstract data types. Moreover, those skilled in the art will appreciate that the invention may be practiced with other computer system configurations, including hand-held devices, multiprocessor systems, microprocessor based or programmable consumer electronics, network person computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing the invention includes a general purpose computing device in the form of a conventional personal computer 220, including a processing unit 221, a system memory 222, and a system bus 223 that couples various system components including the system memory to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226, containing the basic routines that helps to transfer information between elements within personal computer 220, such as during start-up, is stored in ROM 224. Personal computer 220 further includes a hard disk drive 227 for reading from and writing to a hard disk, not shown, a magnetic disk drive 228 for reading from or writing to a removable magnetic disk 229, and an optical disk drive 230 for reading from or writing to a removable optical disk 231 such as a CD-ROM or other optical media. Hard disk drive 227, magnetic disk drive 228, and optical disk drive 230 are connected to system bus 223 by a hard disk drive interface 232, a magnetic disk drive interface 233, and an optical disk drive interface 234, respectively. The drives and their associated computer readable media provide nonvolatile storage of computer readable instructions, data structures, program modules, and other data for personal computer 220. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on hard disk 227, magnetic disk 229, optical disk 231, ROM 224, or RAM 225, including an operating system 235, one or more application programs 236, other program modules 237, and program data 238. A user may enter commands and information into personal computer 220 through input devices such as a keyboard 240 and a pointing device 242. Other input devices (not shown) may include a microphone, joystick, game pad, satellite. dish, scanner, or the like. These and other input devices are often connected to processing unit 221 through a serial port interface 246 that is coupled to the system bus, but may be connected by other interfaces, such as a parallel port, game port, or a universal serial bus (USB). A monitor 247 or other type of display device is also connected to system bus 223 via an interface, such as a video adapter 248. In addition to the monitor, personal computers typically include other peripheral output devices (not shown), such as speakers and printers.

Personal computer 220 may operate in a networked environment using logical connections to one or more remote computers, such as a remote computer 249. Remote computer 249 may be another personal computer, a server, a router, a network PC, a peer device, or other common network node, and typically includes many or all of the elements described above relative to personal computer 220, although only a memory storage device 250 has been illustrated in FIG. 5. The logical connections depicted in FIG. 5 include a local area network (LAN) 251 and a wide area network (WAN) 252. Such networking environments are commonplace in offices, enterprise-wide computer networks, intranets, and the Internet.

When used in a LAN networking environment, personal computer 220 is connected to local network 251 through a network interface or adapter 253. When used in a WAN networking environment, personal computer 220 typically includes a modem 254 or other means for establishing communications over WAN 252, such as the Internet. Modem 254, which may be internal or external, is connected to system bus 223 via serial port interface 246. In a networked environment, program modules depicted relative to personal computer 220, or portions thereof, may be stored in the remote memory storage device. It will be appreciated that the network connections shown are exemplary and other means of establishing a communications link between the computers may be used.

Exemplary HTML

The following samples of HTML are provided: (1) an HTML compatible format representation of a sample data table selected from EXCEL 2000 and published as a new HTML document in accord with the present invention; (2) a sample of an existing HTML document, and (3) an HTML compatible format representation of a second data table selected from EXCEL 2000, different than that in (1), appended to the end of the existing HTML document of sample (2), in accord with the present invention.

Sample 1

```
<html xmlns:o="urn:schemas-microsoft-com:office:office"
xmlns:x="urn:schemas-microsoft-com:office:excel"
xmlns="http://www.w3.org/TR/REC-html40"><head>
<meta http-equiv=Content-Type content="text/html; charset=windows-1252">
<meta name=ProgId content=Excel.Sheet>
<meta name=Generator content="Microsoft Excel 9">
<link rel=File-List href="./Publish_files/filelist.xml">
<style id="Book2_4606_Styles">
<!--table
        {mso-displayed-decimal-separator:"\.";
        mso-displayed-thousand-separator:"\,";}
.xl154606
        {padding-top:1px;
        padding-right:1px;
        padding-left:1px;
        mso-ignore:padding;
        color:windowtext;
        font-size:10.0pt;
        font-weight:400;
        font-style:normal;
        text-decoration:none;
        font-family:Arial;
        mso-generic-font-family:auto;
        mso-font-charset:0;
        mso-number-format:General;
        text-align:general;
        vertical-align:bottom;
        mso-background-source:auto;
        mso-pattern:auto;
        white-space:nowrap;}
.xl224606
        {padding-top:1px;
        padding-right:1px;
        padding-left:1px;
```

-continued

```
                mso-ignore:padding;
                color:windowtext;
                font-size:10.0pt;
                font-weight:400;
                font-style:normal;
                text-decoration:none;
                font-family:Arial;
                mso-generic-font-family:auto;
                mso-font-charset:0;
                mso-number-format:0%;
                text-align:general;
                vertical-align:bottom;
                mso-background-source:auto;
                mso-pattern:auto;
                white-space:nowrap;}
        -->
        </style>
        </head><body>
        <!--[if !excel]>  <![endif]-->
        <!--The following information was generated by Microsoft EXCEL 2000's
Publish as Web
        Page wizard.-->
        <!--If the same item is republished from EXCEL 2000, all information between
the DIV
        tags will be replaced.-->
        <!---------------------------->
        <!--START OF OUTPUT FROM EXCEL 2000 PUBLISH AS WEB PAGE
WIZARD-->
        <!---------------------------->
        <div id="Book2_4606" align=center x:publishsource="Excel">
        <table x:str border=0 cellpadding=0 cellspacing=0 width=256 style='border-
collapse:
        collapse;table-layout:fixed;width:192pt'>
        <col width=64 span=4 style='width:48pt'>
        <tr height=17 style='height:12.75pt'>
            <td          height=17          class=xl154606             width=64
style='height:12.75pt;width:48pt'>Alpha</td>
            <td class=xl154606 width=64 style='width:48pt'>Beta</td>
            <td class=xl154606 width=64 style='width:48pt'>Gamma</td>
            <td class=xl154606 width=64 style='width:48pt'>Delta</td>
        </tr>
        <tr height=17 style='height:12.75pt'>
            <td      height=17       class=xl224606      align=right      style='height:12.75pt'
x:num="00.43">43%
            </td>
            <td class=xl224606 align=right x:num="00.86">86%</td>
            <td class=xl224606 align=right x:num="00.77">77%</td>
            <td class=xl224606 align=right x:num="00.61">61%</td>
        </tr>
        <tr height=17 style='height:12.75pt'>
            <td      height=17       class=xl224606      align=right      style='height:12.75pt'
x:num="00.03">3%
            </td>
            <td class=xl224606 align=right x:num="00.55">55%</td>
            <td class=xl224606 align=right x:num="00.16">16%</td>
            <td class=xl224606 align=right x:num="00.29">29%</td>
        </tr>
        <tr height=17 style='height:12.75pt'>
            <td      height=17       class=xl224606      align=right      style='height:12.75pt'
x:num="00.59">59%
            </td>
            <td class=xl224606 align=right x:num="00.71">71%</td>
            <td class=xl224606 align=right x:num="00.08">8%</td>
            <td class=xl224606 align=right x:num="00.4">40%</td>
        </tr>
        <![if supportMisalignedColumns]>
        <tr height=0 style='display:none'>
            <td width=64 style='width:48pt'></td>
            <td width=64 style='width:48pt'></td>
            <td width=64 style='width:48pt'></td>
            <td width=64 style='width:48pt'></td>
        </tr>
        <![endif]>
        </table></div><!---------------------------->
        <!--END OF OUTPUT FROM EXCEL PUBLISH AS WEB PAGE WIZARD-->
        <!---------------------------->
        </body></html>
```

Sample 2

```
<html>
<head>
<title>HTMLDocument</title>
</head>
<body>
<h4>Existing stuff on some html page.</h4>
<center><img src=images/MontSt-Michel.jpg></center>
</body>
</html>
```
Sample 3

```
<html xmlns:o="urn:schemas-microsoft-com:office:office"
xmlns:x="urn:schemas-microsoft-com:office:excel"
xmlns="http://www.w3.org/TR/REC-html40"><head>
<title>HTMLDocument</title>
<link rel=File-List href="./ExistingHTMLAfter_files/filelist.xml">
<style id="Book1_18074_Styles">
<!--table
        {mso-displayed-decimal-separator:"\.";
        mso-displayed-thousand-separator:"\,";}
.xl1518074
        {padding-top:1px;
        padding-right:1px;
        padding-left:1px;
        mso-ignore:padding;
        color:windowtext;
        font-size:10.0pt;
        font-weight:400;
        font-style:normal;
        text-decoration:none;
        font-family:Arial;
        mso-generic-font-family:auto;
        mso-font-charset:0;
        mso-number-format:General;
        text-align:general;
        vertical-align:bottom;
        mso-background-source:auto;
        mso-pattern:auto;
        white-space:nowrap;}
.xl2218074
        {padding-top:1px;
        padding-right:1px;
        padding-left:1px;
        mso-ignore:padding;
        color:windowtext;
        font-size:10.0pt;
        font-weight:700;
        font-style:normal;
        text-decoration:none;
        font-family:Arial, sans-serif;
        mso-font-charset:0;
        mso-number-format:General;
        text-align:center;
        vertical-align:bottom;
        border:.5pt solid windowtext;
        background:#99CCFF;
        mso-pattern:auto none;
        white-space:nowrap;}
.xl2318074
        {padding-top:1px;
        padding-right:1px;
        padding-left:1px;
        mso-ignore:padding;
        color:windowtext;
        font-size:10.0pt;
        font-weight:400;
        font-style:normal;
        text-decoration:none;
        font-family:Arial;
        mso-generic-font-family:auto;
        mso-font-charset:0;
        mso-number-format:General;
        text-align:general;
        vertical-align:bottom;
        border:.5pt solid windowtext;
        background:silver;
        mso-pattern:auto none;
        white-space:nowrap;}
-->
```

-continued

```
        </style>
        </head>
        <body>
        <h4>Existing stuff on some html page.<h4>
        <center><img src=images/MontSt-Michel.jpg></center>
        <!--[if !excel)>  <![endif]-->
        <!--The following information was generated by Microsoft EXCEL 2000's
Publish as Web
        Page Wizard.-->
        <!--If the same item is republished from EXCEL 2000, all information between
the DIV
        tags will be replaced.-->
        <!---------------------------->
        <!--START OF OUTPUT FROM EXCEL 2000 PUBLISH AS WEB PAGE
WIZARD-->
        <!---------------------------->
        <div id="Book1_18074" align=center x:publishsource="Excel">
        <table x:str border=0 cellpadding=0 cellspacing=0 width=128 style='border-
collapse:
        collapse;table-layout:fixed;width:96pt'>
        <col width=64 span=2 style='width:48pt'>
        <tr height=17 style='height:12.75pt'>
        <td colspan=2 height=17 class=xl2218074 width=128 style='height:12.75pt;
        width:96pt'>From Excel</td>
        </tr>
        <tr height=17 style='height:12.75pt'>
        <td height=17 class=xl2318074 style='height:12.75pt;border-top:none'>new
data</td>
        <td class=xl2318074 style='border-top:none;border-left:none'>new data</td>
        </tr>
        <tr height=17 style='height:12.75pt'>
        <td height=17 class=xl2318074 style='height:12.75pt;border-top:none'>new
data</td>
        <td class=xl2318074 style='border-top:none;border-left:none'>new data</td>
        </tr>
        <tr height=17 style='height:12.75pt'>
        <td height=17 class=xl2318074 style='height:12.75pt;border-top:none'>new
data</td>
        <td class=xl2318074 style='border-top:none;border-left:none'>new data</td>
        </tr>
        <![if supportMisalignedColumns]>
        <tr height=0 style='display:none'>
        <td width=64 style='width:48pt'></td>
        <td width=64 style='width:48pt'></td>
        </tr>
        <![endif]>
        </table></div><!---------------------------->
        <!--END OF OUTPUT FROM EXCEL PUBLISH AS WEB PAGE WIZARD-->
        <!--------------------------->
        </body>
        </html>
```

Although the present invention has been described in connection with a preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for using an application program in which data having a format and a functionality specific to the application program are created, to publish a portion of the data into an HTML document such that when changes to the original data are made in the application program, those changes may be readily republished into the HTML document to replace the previously published data, and so that all data published into an HTML document retains any formatting information specific to the application program to enable any published data to be reintroduced into the application program with all its original format and functionality intact, the method comprising the steps of:

(a) using the application program to select the portion of the original data to be published;

(b) translating the original data selected into translated original data having an HTML compatible format, while preserving parameters that define the format and functionality of the data within the application program used to create the data and including a unique identifier (ID) tag so that all of the translated original data may be readily located within the HTML document;

(c) automatically inserting the translated original data selection into the HTML document;

(d) modifying the original data selection within the application program, to be republished into the HTML document;

(e) translating the modified data selection into translated modified data having an HTML compatible format, the translated modified data preserving parameters that define the format and functionality of the modified data within the application program used to create the data and including a unique ID tag so that all of the translated modified data may be readily located within the HTML document;

(f) parsing the HTML document until the unique ID tag for all of the translated original data that were published is found; and (g) replacing all of the translated original data with all of the translated modified data.

2. The method of claim 1, wherein the application program comprises a spreadsheet program and the data that are translated include one of a data table and a chart.

3. The method of claim 1, wherein the translated original data are inserted into an existing HTML document immediately preceding the close body tag (</body>) of the HTML document.

4. The method of claim 1, wherein the translated original data are inserted into an existing HTML document at a marker tag previously inserted into the HTML document.

5. The method of claim 1, wherein the HTML document does not yet exist, and is created by the act of publishing the translated original data as a new HTML document.

6. The method of claim 1, wherein the step of preserving the format of the translated original data comprises the step of storing formatting information for the translated original data within a style section of the HTML document.

7. The method of claim 1, wherein the step of inserting the translated original data selection into the HTML document comprises the step of using the application program to insert tags into the HTML document to indicate a beginning and end of the translated original data inserted into the HTML document, and to indicate functional elements of said data.

8. The method of claim 1, wherein the step of preserving the format of the translated modified data comprises the step of storing formatting information for the translated modified data within a style section of the HTML document.

9. A method for enabling data from a spreadsheet to be published into an HTML document, and subsequently republished into the HTML document to include changes made in the data within the spreadsheet, comprising the steps of:

(a) specifying an original data selection that is to be published, within the spreadsheet;

(b) translating the original data selection into a translated data having an HTML compatible format, said translated data including a unique identifier (ID)) tag so that the translated data may be readily located within the HTML document;

(c) incorporating the translated data into the HTML document;

(d) modifying the original data selection within the spreadsheet, producing modified data that are to be republished into the HTML document;

(e) translating the modified data to produce translated republished data having an HTML compatible format, said translated republished data including the unique ID tag;

(f) parsing the HTML document until the unique ID tag for the translated data is found; and (g) replacing the translated data with the translated republished data.

10. The method of claim 9, further comprising the step of restoring either the translated data or the translated republished data back into the spreadsheet, wherein the steps of translating both the original data selection and modified data each further comprises the step of including information in the HTML document that enables the translated data and translated republished data, respectively, to retain their functionality when restored back into the spreadsheet.

11. The method of claim 10, wherein the step of restoring comprises the step of retranslating the translated data or the translated republished data in the HTML document back into a format required by the spreadsheet.

12. The method of claim 9, wherein the original data selection and the modified data comprise a chart.

13. The method of claim 9, wherein the HTML document into which the translated data are incorporated is an existing HTML document, so that the translated data are appended to an end of the existing HTML document.

14. The method of claim 9, wherein the unique ID tag comprises a randomly generated number.

15. The method of claim 14, wherein the unique ID tag further comprises a parameter associated with the original data selection or modified data, which is associated with the spreadsheet.

16. The method of claim 15, wherein the parameter is a workbook name.

17. A method for enabling data from a spreadsheet to be published into an HTML document, such that the data published into the HTML document are restorable back into the spreadsheet without loss of formatting and functionality within the spreadsheet, comprising the steps of:

(a) specifying a data selection within the spreadsheet that is to be published into the HTML document;

(b) translating the data selection into translated data having an HTML compatible format, but including information required for maintaining formatting and functionality of the data selection when the translated data are restored in the spreadsheet, said information being retained within a comment section of the HTML document; and (c) automatically incorporating the translated data into the HTML document.

18. The method of claim 17, further comprising the step of creating the HTML document into which the translated data are published when the step of publishing occurs.

19. The method of claim 17, wherein the translated data are inserted into an existing HTML document.

20. The method of claim 19, wherein the translated data are appended to an end of the existing HTML document.

21. The method of claim 19, wherein the translated data are identified by a unique ID tag that is maintained with the translated data and stored with the spreadsheet, said unique ID tag indicating a location within the HTML document at which the translated data are inserted.

22. The method of claim 21, further comprising the steps of:

(a) enabling a user to change the data selection within the spreadsheet after it has been published into the HTML document;

(b) translating the data selection as changed into translated republish data having an HTML compatible format; and (c) using the unique ID tag to locate the translated data within the HTML document, replacing the translated data in the HTML document with the translated republish data.

23. An article of manufacture adapted for use with a computer, comprising:

(a) a memory media; and (b) a plurality of machine instructions stored on the memory media, said plurality of machine instructions, when executed by a computer, implementing a plurality of functions, including:

(i) enabling a user to specify an original data selection to be published as original translated data into an HTML document;

(ii) translating the data selection into the original translated data having an HTML compatible format, said original translated data including a unique identifier (ID) tag so that the original translated data may be readily located within the HTML document;

(iii) incorporating the original translated data into the HTML document in association with the unique ID tag;

(iv) translating a modification of the original data selection into translated republished data having an HTML compatible format, said translated republished data including the unique ID tag;

(v) parsing the HTML document until the unique ID tag for the original translated data is found; and (vi) replacing the original translated data with the translated republished data.

24. The article of manufacture of claim 23, wherein the application program is a spreadsheet program and the data selection comprises one of a data table and a chart.

25. The article of manufacture of claim 23, wherein the original translated data are inserted into the HTML document at a predefined location.

26. A system for enabling an application program having no HTML editing capability to directly publish a data selection into an HTML document, such that the data published into the HTML document are restorable back into the application program without loss of formatting and functionality within the application program, comprising:

(a) a memory in which a plurality of machine instructions defining the application program are stored;

(b) a display; and (c) a processor that is coupled to the memory to access the machine instructions and to the display, said processor executing said machine instructions to implement a plurality of functions, including:

(i) enabling a user to specify the data selection to be published into the HTML document;

(ii) translating the data selection into translated data having an HTML compatible format, said translated data including information required for maintaining formatting and functionality of the data selection if the translated data are restored into the application program, said information being retained within a comment section of the HTML document; and (iii) inserting the translated data into the HTML document so that the translated data are viewable on the display.

27. The system of claim 26, wherein the application program comprises a spreadsheet program and the data selection comprises one of a data table and a chart.

28. The system of claim 26, wherein the machine instructions further cause the processor to enable changes in the data selection to be republished into the HTML document, by translating the data selection that has been changed into translated republish data having an HTML compatible format, and replacing the translated data with the translated republish data in the HTML document.

* * * * *